United States Patent
Österling et al.

(10) Patent No.: US 8,027,643 B2
(45) Date of Patent: Sep. 27, 2011

(54) METHOD AND A RADIO BASE STATION IN A TELECOMMUNICATIONS SYSTEM

(75) Inventors: Jacob Österling, Järfälla (SE); Vimar Björk, Göteborg (SE); Alireza Nejatian, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 443 days.

(21) Appl. No.: 12/327,337

(22) Filed: Dec. 3, 2008

(65) Prior Publication Data
US 2010/0136932 A1   Jun. 3, 2010

(30) Foreign Application Priority Data
Jun. 26, 2008   (WO) ................. PCT/SE2008/050785

(51) Int. Cl.
*H04B 1/00* (2006.01)
*H04B 7/00* (2006.01)
(52) U.S. Cl. ......................................................... 455/69
(58) Field of Classification Search ...................... 455/69
See application file for complete search history.

(56) References Cited

U.S. PATENT DOCUMENTS
7,599,454 B2 * 10/2009 He ................................ 375/347

FOREIGN PATENT DOCUMENTS
WO   WO 2005/034544 A1   4/2005

OTHER PUBLICATIONS
CPRI. Common Public Radio Interface (CPRI) Interface Specification. CPRI Specification V3.0 (Oct. 20, 2006).

* cited by examiner

*Primary Examiner* — Lincoln Donovan
*Assistant Examiner* — Daniel Rojas

(57) ABSTRACT

The present invention relates to radio base stations including a standardized interface CPRI between a Radio Equipment (RE) and a Radio Equipment Controller (REC). The present invention also relates to a method. The problem addressed is how to convey calibration information from the RE to the REC, when the capacity is occupied by radio IQ samples. The solution is to suppress the IQ samples to get capacity for the calibration information. Various embodiments of the invention focus on reducing the negative impact the suppression of IQ data may have on detecting the signals received.

35 Claims, 7 Drawing Sheets

US 8,027,643 B2

METHOD AND A RADIO BASE STATION IN A TELECOMMUNICATIONS SYSTEM

TECHNICAL FIELD

The present invention relates generally to the field of radio communications, and, more particularly to a method and a radio base station adapted for carrying information relating to calibration of the radio receiving or radio transmitting chain.

BACKGROUND

A general radio base station (RBS) usually comprises different parts such as a radio equipment (RE) unit and a radio equipment controller unit (REC). The RE includes radio transceiver parts used to connect to one or several antennas and is responsible to perform e.g. conversion between digital baseband signals and analog radio frequency signals that interface with one or several antennas. The REC comprises all control functions ranging from the processing of radio information in the digital baseband domain to radio resource control layer functions. An interface named Common Public Radio Interface (CPRI) is used for handling communication between the REC and the RE parts. The CPRI interface is a standardized interface and is used for multiplexing In-Phase and Quadrature (IQ) data and synchronization and control/management of the RE onto a single link. The CPRI interface is currently specified for WCDMA (Wideband Code Division Multiple Access) and WIMAX (Worldwide Interoperability Microwave Access) systems. By using the CPRI interface, system/network designers have the flexibility to either co-locate the REC and the RE within a single enclosure or to remotely locate the RE from the REC in a distributed topology.

The main part of the CPRI interface bandwidth is used to convey baseband samples, so called IQ samples, of radio signals received and of radio signals to be transmitted. The IQ samples, which relates to user data, include phase and amplitude information. The CPRI interface also has the possibility to convey multiple different independent streams of IQ samples, where each bidirectional stream transported is the digital baseband data associated with the transmission and reception of one wireless carrier at one antenna. These IQ sample streams are referred to as antenna carriers (AxC) in the CPRI standard. Since one AxC represents the samples for one carrier on one antenna, then two carriers on each two antennas use four AxCs. The higher the sample rate of the AxC, the higher the bit rate usage on the CPRI interface. If, for example, a 20 MHz carrier is used on the radio interface, such as in LTE (Long Term Evolution) system, up to 30.72 Msamples/s per AxC are used. With 30 bit samples, a 2.4576 Gbps CPRI interface can convey two such 20 MHz LTE AxC.

The CPRI interface between the REC and the RE, is time divided into Basic Frames. A Basic Frame is the fundamental unit of the CPRI frame structure and is a 16-word frame. The first $1/16$:th of the Basic Frame consists of a Control Word (CW) for synchronization and control signaling, and the following $15/16$:th of the Basic Frame consists of the IQ field i.e. user data payload where the IQ samples are transmitted. Each Basic Frame is ($1/3.84$) micro seconds long (or approximately 260.42 ns long). Each AxC has an AxC Container defined in which it shall place its IQ samples. The AxC container points out what part of the IQ Field to use.

In the LTE system and other systems supporting multiple input multiple output (MIMO) antennas or beam forming, it gives a performance benefit to have complete control of the phase difference between the antennas, both in the uplink (UL) direction and in the downlink (DL) direction. To get control, calibration is needed. One good way is to measure the transmission, e.g. receive the own transmitted signal and feeding it back to the signal processing in the REC via the CPRI interface. Correspondingly, a well defined signal can be fed to the receivers and the distorted signal measured in the signal processing in the REC. When the REC receives calibration information it is able to compensate for phase distortion and for attenuation varieties by means of digital signal processing. These distortion and varieties are often caused by temperature variations in the analogue parts of the RE. The extra reception of signals, both for UL and DL calibration, therefore requires extra bandwidth on the CPRI interface.

It is previously known to have a separate calibration RE which can insert signals on the receive antennas, or receive signals from the transmit antennas that are connected to the RE. The signal to transmit and the signal to receive are, as previously described, defined as separate Antenna-Carriers (AxC) on the CPRI interface, thus allocating bandwidth.

SUMMARY

It is thus an object of the present invention to provide calibration information via an interface between a radio equipment and a radio equipment controller when the total capacity of the interface is intended for carrying signal samples.

According to an aspect of embodiments of the present invention, the above stated problem is solved by means of a method for use in a radio base station comprising a radio equipment controller (REC) and a radio equipment (RE) that are connected via a link interface such as the CPRI interface; the method comprising the steps of: transmitting a stream of frames from the RE to the REC over the link interface; the frames carrying samples of a received radio signal received by the RE; including, by the RE, calibration information in a subset of the frames and suppressing radio signal samples to provide capacity in the subset of the frames for carrying the calibration information.

According to another aspect of embodiments of the present invention, the above stated problem is solved by means of a radio base station comprising: a RE that is equipped with interfaces for connecting to antennas; a REC connected to the RE via a first link interface (e.g. CPRI); a calibration RE (cRE) connected to the RE via another link interface (e.g. CPRI) and also connected to the interfaces used for coupling the antennas. The RE is arranged to sample a received radio signal, convert it to a baseband signal for transmission to the REC in a stream of frames over the first link interface; include calibration information in a subset of the frames and suppress signal samples in order to provide capacity in the subset of frames for carrying the calibration information.

According to a further aspect of embodiments of the present invention, the above stated problem is solved by means of a radio base station comprising a unit that combines the functions of the RE and of the cRE. The radio base station also comprises a REC that is connected the RE of the unit via a link interface (e.g. CPRI). The RE is also here equipped with interfaces for connection to antennas. The unit comprises a calibration coupling unit (CCU) that is arranged to be connected to the interfaces (at least two) used to connect to antennas. The CCU is further arranged to sample a transmitted radio signal or signals and to transmit the signal samples to the RE. The RE is arranged to select between the radio signal samples received from the CCU and one or several radio samples received from any of the antennas or antenna branches. The radio equipment is further arranged to down convert the radio signal samples to a baseband signal; transmit the samples of the down converted signal in a stream of frames to the REC; include calibration information in a subset of the frames and suppress signal samples in order to provide capacity in the subset of frames for carrying the calibration information.

An advantage with the embodiments of the present invention is that negative impact/effects caused by the suppressing of signal samples to provide capacity for the calibration information is/are reduced.

Still other objects and advantages of the present invention will become apparent from the following detailed description in conjunction with the accompanying drawings, attention to be called to the fact, however, that the following drawings are illustrative only, and that various modifications and changes may be made in the specific embodiments illustrated as described within the scope of the appended claims. It should further be understood that the drawings are not necessarily drawn to scale and that, unless otherwise indicated, they are merely intended to conceptually illustrate the structures and procedures described herein.

DETAILED DESCRIPTION

In the following description, for purposes of explanation and not limitation, specific details are set forth such as particular architectures, scenarios, techniques, etc. in order to provide thorough understanding of the present invention. However, it will be apparent from the person skilled in the art that the present invention and its embodiments may be practiced in other embodiments that depart from these specific details.

The different embodiments of the present invention are described herein by way of reference to particular example scenarios. In particular the invention is described in a non-limiting general context in relation to a communications network based on the third generation (3G) long term evolution (LTE) concept also named eUTRA which is currently standardized by the third generation partnership project (3GPP). It should be noted that the present invention is not restricted to 3GPP LTE but can be applicable in other wireless systems such as WiMAX (worldwide interoperability for microwave access), or HSPA (high speed packet access) or WCDMA (wideband code division multiple access).

Figure 1A:
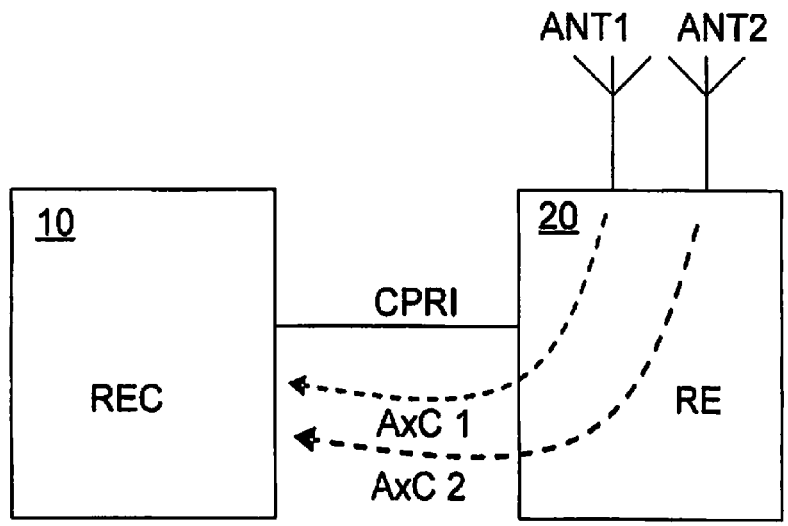
FIG. 1a is a prior art block diagram of parts of a radio base station.

Referring to FIG. 1a, there is illustrated a simple block diagram of a prior art 3G LTE radio base station 100 including, as previously described, a radio equipment control (REC) part 10 and a radio equipment (RE) part 20. A 3G LTE radio base station is also known as a NodeB or a evolved NodeB (eNB). As shown in FIG. 1a, the REC 10 and the RE 20 are connected to each other via a link interface which corresponds here to the CPRI link interface. The RE 20 is shown equipped with two antennas denoted ANT1 and ANT2 which are used to transmit and receive signals to/from mobile or wireless terminals (not shown) in a 3G LTE network. A terminal is also known as a user equipment (UE). In a 3G LTE system, the radio interface is scheduled in time into radio sub-frames and typically a spectrum allocation of a 20 MHz frequency carrier is divided in time into a sequence of sub-frames. In uplink (UL) and downlink (DL) transmission directions, mobile terminals are scheduled in different sub-frames, wherein several mobile terminals may be scheduled in the same sub-frame. The CPRI link interface between REC 10 and RE 20, as shown in FIG. 1a, is used to convey two antenna carriers (AxC), denoted AxC 1 and AxC 2. AxC 1 represents samples for one carrier (or one frequency) on ANT 1, and AxC 2 represents samples for one carrier (or one frequency) on ANT 2. In the DL direction, the CPRI interface conveys AxC1 and AxC2 starting from the REC 10 to the RE 20 and further to the terminal(s). In the UL direction (shown in FIG. 1a), signals from one or more terminals are received at ANT1 and ANT2 and the CPRI interface conveys AxC1 and AxC2 from RE 20 to the REC 10.

Figure 1B:
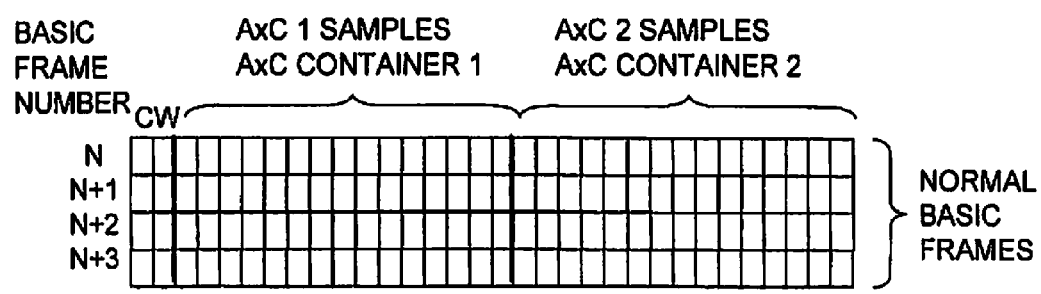
FIG. 1b is a prior art frame structure diagram.

Referring to FIG. 1b, there is illustrated a number of consecutive Basic Frames (n, n+1, n+2 and n+3) wherein control words (CW) and IQ samples (payload) are carried. In the frame structure shown in FIG. 1b, each AxC is used to fill its AxC Container with its respective IQ samples. Thus AxC1 fills AxC container 1 with its IQ samples and AxC2 fills AxC container 2 with its IQ samples. A CPRI link rate of 2.4576 Gbps with 20 MHz AxC and 30 bits/sample, can be achieved using the frame structure according to FIG. 1b.

As mentioned before, in the LTE system and other systems supporting multiple input multiple output (MIMO) antennas or beam forming, it gives a performance benefit to have complete control of the phase difference between the antennas, both in UL direction and in the DL direction. To get control, calibration is thus needed. Therefore, according to an embodiment of the present invention, a calibration RE (cRE) is added to the RE in order e.g. to measure the phase and amplitude difference between the antennas.

Figure 2:
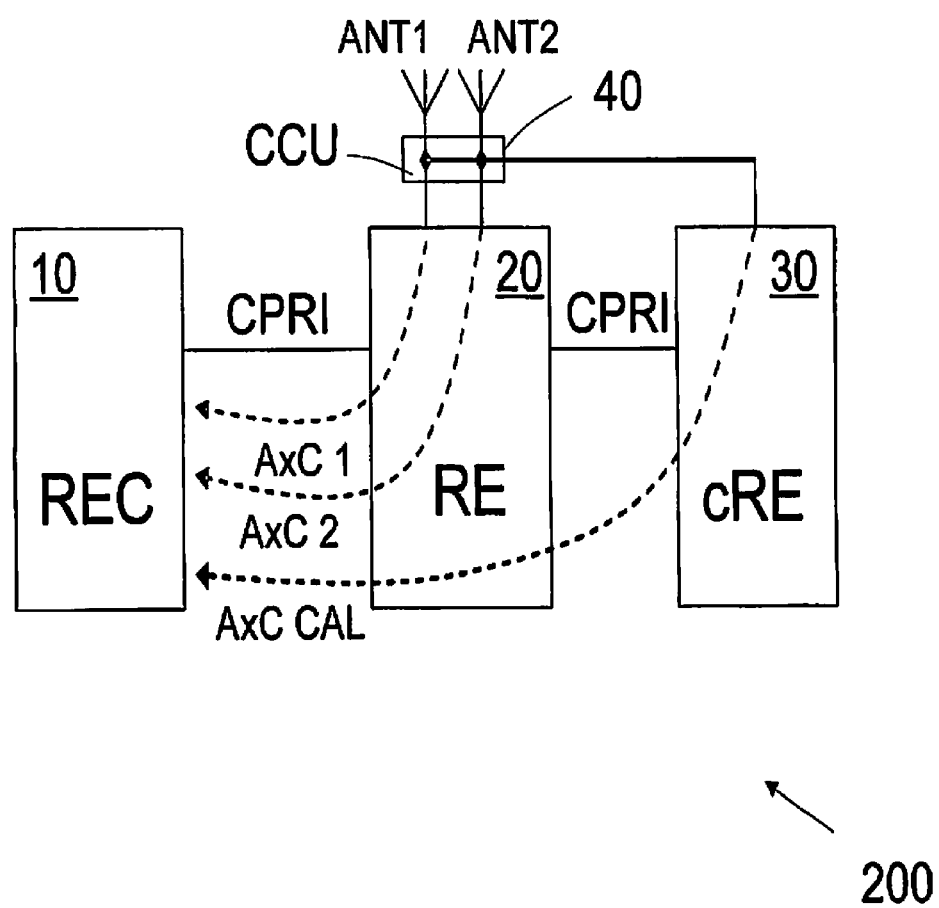
FIG. 2 is a block diagram of an exemplary radio base station including parts of FIG. 1a and a calibration equipment added.

FIG. 2 illustrates a block diagram of an exemplary radio base station 200 according to an embodiment of the present invention. As shown a cRE 30 is added. The RE 20 is connected to the cRE 30 via a second link interface (e.g. the CPRI interface). The cRE 30 is also connected, via a calibration coupling unit (CCU) 40, to the RE 20 and to the two interfaces used for coupling the antennas ANT1 and ANT2. It should be noted that the present invention is not restricted to only two antennas. Furthermore, each antenna (ANT1 or ANT2) maybe connected to the RE via two interfaces, one for transmission (TX) and one for reception (RX). For the CCU 40, passive radio frequency (RF) couplers maybe utilized. The cRE 30 according to an embodiment of the present invention has the capability to insert an RF signal on all normal RE antennas and to receive a signal (or a portion of the signal) transmitted by the RE 20.

According to embodiments of the present invention, the calibration is controlled by the REC 10 that decides on the time instant, direction (transmit/receive) and duration of the calibration. The RE 20 is instead responsible to include calibration information in a subset of frames including samples of a received radio signal thus suppressing samples to provide capacity in the subset of frames for carrying the calibration information. According to the present invention, the calibration information to be included in the subset of frames by the RE 20 can be generated for the DL direction and for the UL direction. For the DL calibration, RF portions of the normal traffic signals are received on the respective antennas. By normal traffic signals is meant here DL signals to be transmitted to one or more terminals from the REC 10 via the antennas connected to the RE 20. The different portions of transmitted normal traffic signals are summed in the CCU 40 and fed to the cRE 30. The cRE 30 down converts the sum from RF to baseband signal and sends it back to the REC 10 via the RE 20, for signal processing. In the DL calibration case, an extra AxC is defined called the AxC Cal (see FIG. 2), and that conveys the down converted sum of the transmit signals from cRE 30 to the REC 10 via RE 20.

For the UL calibration, and according to an embodiment of the present invention, the cRE 30 is arranged to generate a test signal, up converting it into a RF signal and inserting it into the multiple receive paths of the RE 10 by using the CCU 40. The RE 20 subsequently down converts the received signal from RF to a baseband signal and then sends it to the REC 10 for signal processing. In the UL calibration case, the AxC 1 (or AxC container 1) and AxC 2 (AxC container 2) are used for sending the down converted test signal to the REC 10 via the RE 20.

FIG. 2 also illustrates schematically the configuration and the signal flows used for the UL direction and for the DL direction. As mentioned above, it is the REC 10 that controls when the calibration is to be performed. When considered needed, the REC 10 initiates either an UL calibration or a DL calibration. In addition, the REC 10 also decides what AxC container the calibration data (calibration information) shall have in case of DL calibration. The RE 20, as mentioned before, is responsible to include calibration information in a subset of frames. The frames include containers carrying IQ samples of received radio signal/signals which are received over the separate antenna carriers e.g. AxC1 and AxC2.

According to an embodiment of the present invention, part/parts of the IQ field is/are, during calibration duration, allocated to samples (IQ samples) of the calibration information. For DL calibration, the RE 20 allocates/includes the calibration information (AxC Cal) in e.g. AxC2 or AxC1 depending on the decision of the REC 10. Since the calibration only needs to be done often enough to compensate for aging and temperature drift of the RE 20 and its antenna system, the REC 10 can e.g. estimate that the calibration be done in the order of once every second. It should be noted that the time instant, duration and direction (UL/DL) of the calibration are design parameters and the present invention is not restricted to any specific value.

Figure 3:
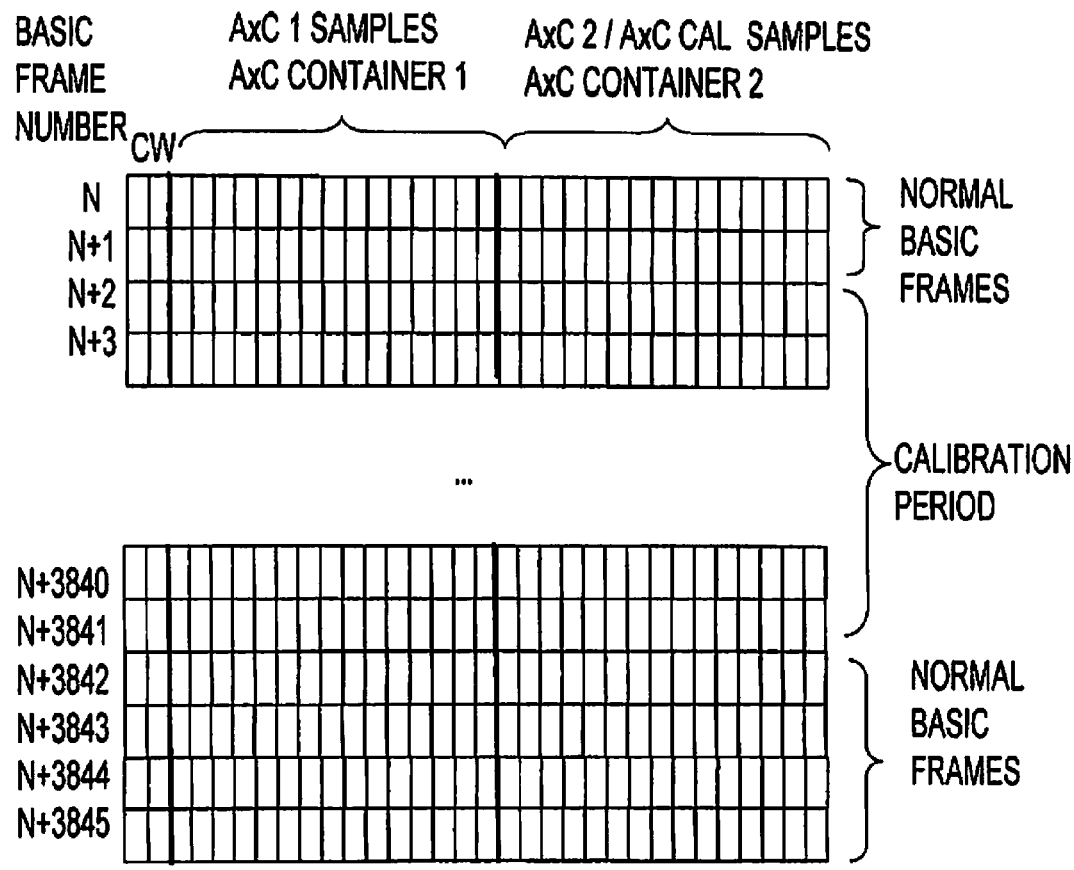
FIG. 3 is an exemplary frame structure diagram in accordance with an exemplary embodiment of the present invention.

Referring to FIG. 3, there is illustrated an example of a frame structure on the CPRI interface adapted for the DL calibration, in accordance with an exemplary embodiment of the present invention. The example shows that the AxC container 2 is used for conveying the calibration information AxC Cal received by the RE from the cRE. According to an embodiment of the present invention, the subset of frames that the RE uses to include the AxC Cal, corresponds to the capacity needed to carry one radio sub-frame. In the LTE case shown in FIG. 3, the radio sub-frame used to carry AxC Cal is 1 ms long and corresponds to Basic Frame n+2 to Basic Frame n+3841. Thus, the calibration period of e.g. 1 ms is used for AxC Cal which is conveyed over the interface i.e. the CPRI interface.

As mentioned earlier concerning the UL calibration, both AxC container 1 and AxC container 2 can be used to send the test signal (corresponding to the calibration information). Therefore, when frames including radio signal samples (IQ samples) of normal UL traffic are received at the antennas attached to the RE, the RE can include the calibration information (or test signal samples) in a subset of frames by time multiplexing. According to an embodiment of the present invention, the RE discards the signal samples i.e. IQ samples (of normal UL traffic) in the frames to set the containers in the subset of frames free for carrying the calibration information. According to another embodiment, the RE adds, sample by sample, the signal samples i.e. the IQ samples (of normal UL traffic) with the samples of the calibration information.

Common to both calibration cases is that normal UL traffic signals are affected by the inclusion of calibration information. In other words, both calibrations cases affect negatively normal UL conveying of IQ samples. Therefore, further embodiments of the present invention provide alternative ways for minimizing this negative effect. The different alternative ways are presented below.

In one embodiment of the present invention, the subset of frames for carrying the calibration information is selected when the subset of frames corresponds to a radio sub-frame during which the number of scheduled terminals is very few i.e. lower than a predetermined number. As an example, the REC minimizes the number of terminals scheduled uplink during the radio sub-frame used to carry the calibration information. The predetermined number of terminals mentioned above is considered a design parameter. Therefore, the present invention is not restricted to any specific number of scheduled terminals.

According to another embodiment of the present invention, when two or more AxCs (or AxC containers) carry radio signal samples from one or several mobile terminals, then signal samples of one of the AxCs (containers) are selected to be discarded when the REC estimates that the non-discarded radio signal samples of the other AxC (container) have a quality that enables signal detection. Thus, in this exemplary embodiment, during one radio sub-frame, one AxC is selected to carry normal traffic and the other AxC is used to carry the calibration information to be conveyed over the CPRI interface. Therefore, in this case, time multiplexing the calibration information does not destroy all traffic signals; it only decreases the signal-to-noise ratio of the reception by reducing the number of available antennas (or AxCs). In addition, the calibration information replaces the radio signal samples in one AxC (or one AxC container) when communicating with one or more terminals which experience a quality that enables signal detection (i.e. experience good signal quality or good signal-to-noise ratio).

According to another embodiment of the present invention, decreasing the negative effect or impact on normal UL traffic signals by the inclusion of calibration information can be achieve by actively scheduling terminals to make some radio sub-frames free, and thereby set free basic frames in the CPRI interface for carrying calibration information. Thus in this case, a selected radio sub-frame is selected to be free from mobile terminal transmission and calibration information is carried in a subset of frames that occur in time for carrying the samples of the selected radio sub-frame. In other words, by omitting to schedule terminals in a certain sub-frame (e.g 1 ms radio sub-frame), normal UL traffic signal stream/streams is/are replaced with the calibration stream/streams during that sub-frame. It should be noted that since LTE is a scheduled system, no terminals are allowed to transmit unless they are explicitly ordered to do so. Therefore, if we do not order (or schedule) one or several terminals to transmit, then we are free to use a CPRI AxC container to carry calibration information instead.

According to yet another embodiment of the present invention, decreasing the impact on normal traffic signals can be achieved by deleting, in the REC, the test signal generated in the cRE and used for the UL calibration case. This is because the test signal that is added to the UL IQ sample is a known signal. The test signal can therefore be deleted from the UL IQ samples in the REC.

Figure 4:
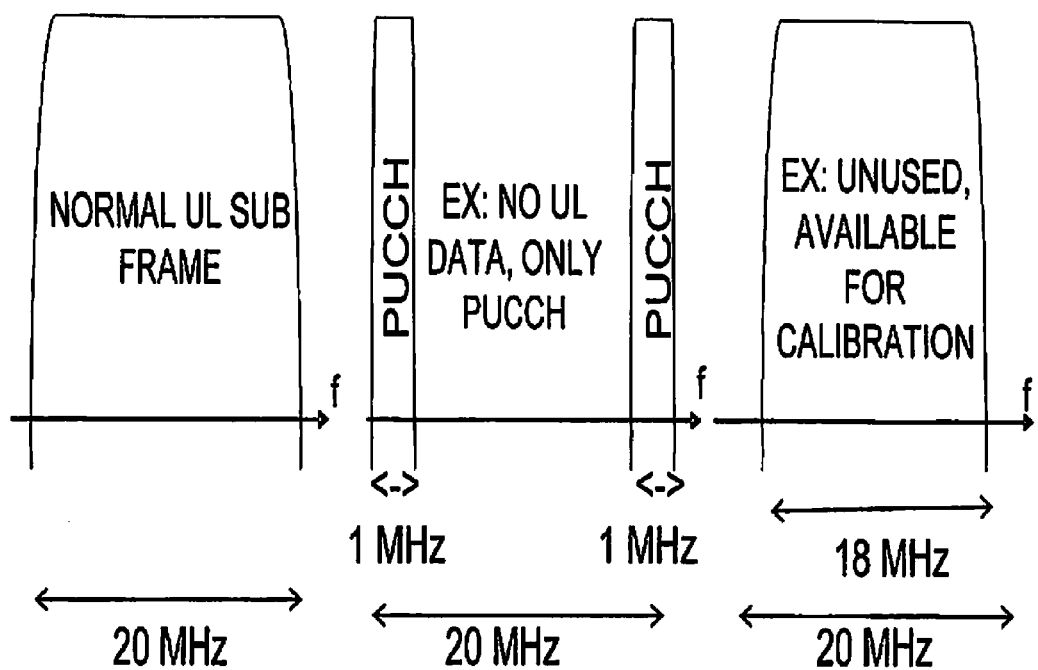
FIG. 4 discloses examples of frequency spectrum usage.

It should be noted that UL sub-frames used for normal UL traffic, include both UL traffic (if scheduled) and feedback information from the DL traffic (e.g. HARQ ACK (hybrid automatic repeat request acknowledge)). The feedback information is sent on the PUCCH (physical uplink control channel) which is located on the UL frequency band edges. Therefore in accordance with further embodiment of the present invention, minimizing the negative impact of the calibration information on the normal UL traffic signals can further be achieved by either not scheduling DL traffic in the sub-frame before, or by limiting the calibration information to the part of the frequency band not carrying PUCCH. This is illustrated in FIG. 4 where frequency spectrum usage is depicted. Thus in this case, one selected radio sub-frame is scheduled to be free from terminal transmission, with exception of one or more sub-band(s) or sub-frequency(ies) of the antenna carrier, and calibration information is then carried in a subset of the frames that occur in time for carrying the samples of the selected radio sub-frame, in a band (or frequency) outside one or more sub-frequency(ies). As an example, if we have a calibration information signal with a limited frequency content e.g. it only sends a 5 MHz signal within a 20 MHz spectrum, we can schedule terminals to send on the remaining 15 MHz spectrum. In the example shown in FIG. 4, a bandwidth of 18 MHz is available for the calibration information, and for the feedback information which is sent on the PUCCH located on the UL frequency band edges, a 2 MHz bandwidth is allocated. The calibration information is thus here limited to the part of the band not carrying PUCCH.

Figure 5:
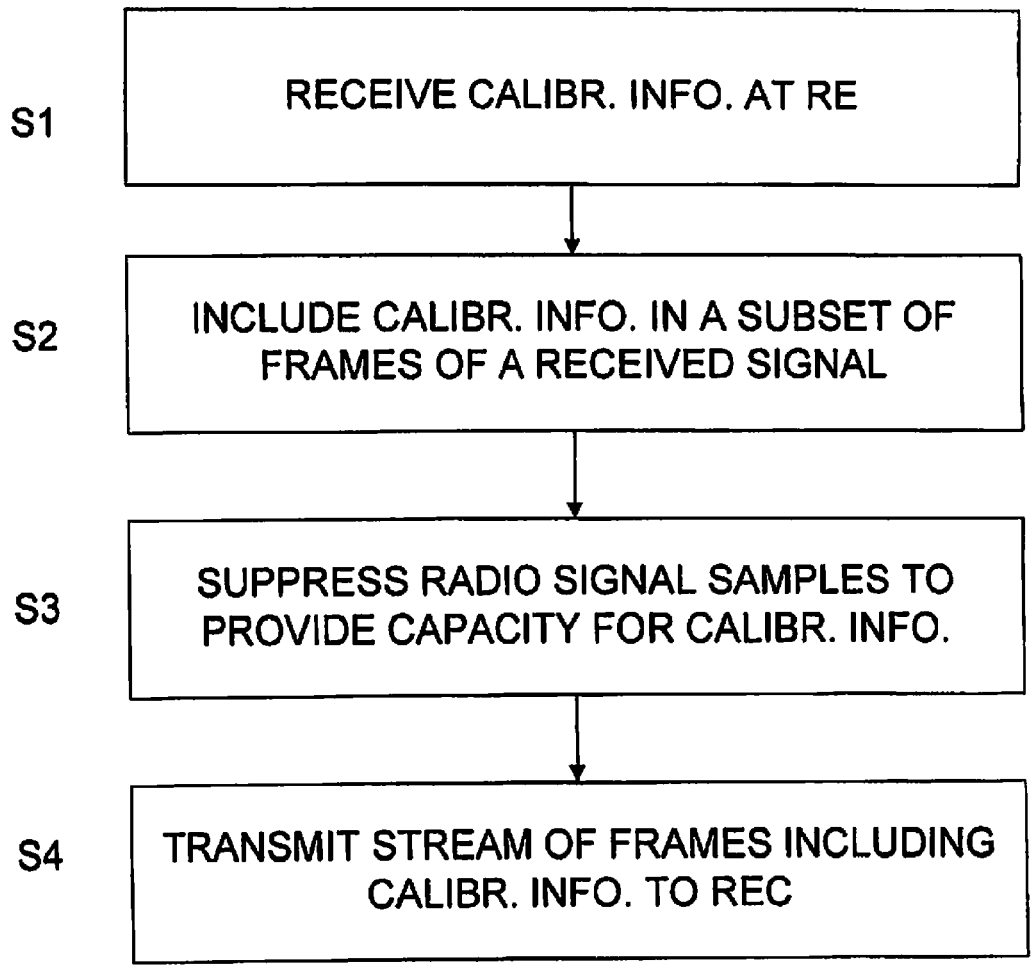
FIG. 5 illustrates a flowchart of a method according to exemplary embodiments of the present invention.

Referring to FIG. 5 there is illustrated a flowchart of a method describing the main steps suitable for use in a radio base station, in accordance with previously described embodiments of the present invention. As shown in FIG. 5, the main steps of the method comprise:

(S1) receiving calibration information at the RE;
(S2) including the calibration information in a subset of frames comprising samples of a received radio signal;
(S3) suppressing radio signal samples to provide capacity in the subset of frames for carrying the calibration information, and
(S4) transmitting stream of frames including the calibration information to the radio equipment controller.

Figure 6A:
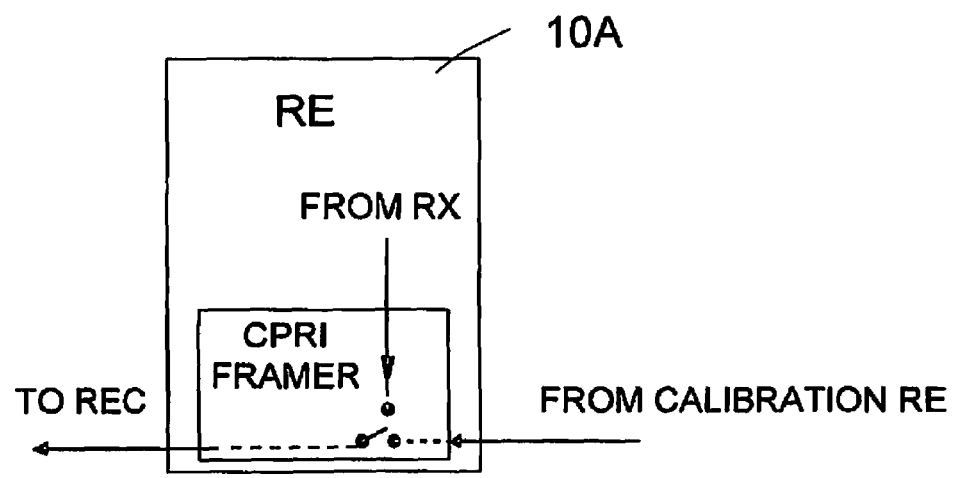
FIG. 6a is a block diagram of an exemplary radio equipment of a radio base station in accordance with an exemplary embodiment of the present invention.
Figure 6B:
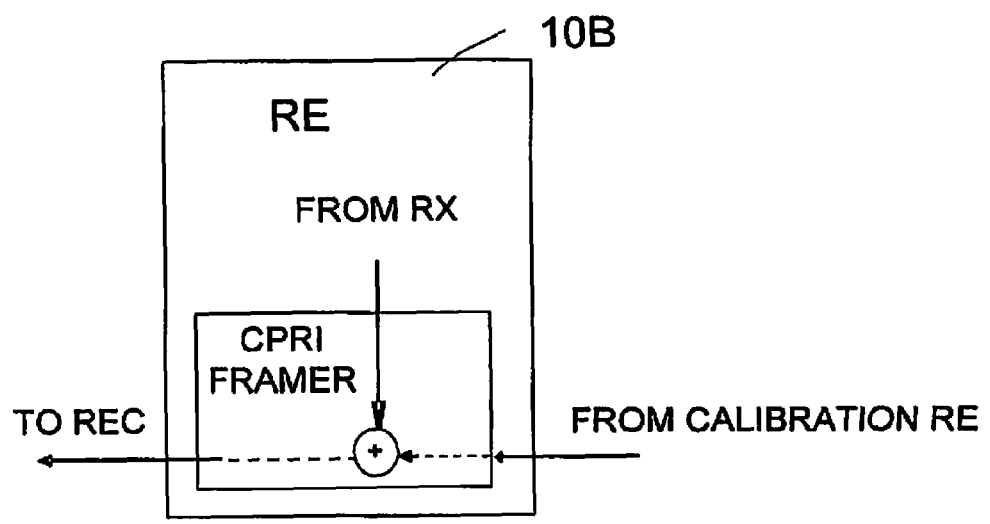
FIG. 6b is a block diagram of another exemplary radio equipment of a radio base station in accordance with another exemplary embodiment of the present invention.

Referring to FIGS. 6a and 6b, there are illustrated two exemplary embodiments of a radio equipment, RE 10A and 10B, which can be used to provide calibration information to a REC in accordance with previously described embodiments of the present invention. As shown in FIGS. 6a and 6b, RE 10A and RE 10B each comprises a CPRI framer which is responsible for mapping the samples from the own radio onto the CPRI interface to the REC. It is enhanced with the possibility of supporting DL calibration:

FIG. 6a represents a time multiplexing approach where the CPRI framer is enhanced with the possibility of selecting either the samples from the own receiver (RX), or forwarding the samples instead coming from the calibration RE (not shown).

FIG. 6b represents a summing approach where the CPRI framer is enhanced with the possibility of adding the samples from the own receiver (RX) with the samples from the cRE and sending the sum to the REC.

Both approaches i.e. the time multiplex approach and the summing approach support the UL calibration with all options. The first approach can time multiplex between e.g. AxC 2 and AxC Cal onto AxC Container 2 and shall thus only be used with UEs where no UL diversity is used. The second approach also supports having a calibration of the part of the spectrum not used by the PUCCH, without affecting the PUCCH performance. In order to support the second approach, the cRE can be configured to transmit only 0 in AxC 2 during periods when DL calibration is not active, or the RE is configured not to include the calibration RE samples in the summation. Either way, control is needed to either of the REs from the REC about the time when the DL calibration is active.

Figure 7:
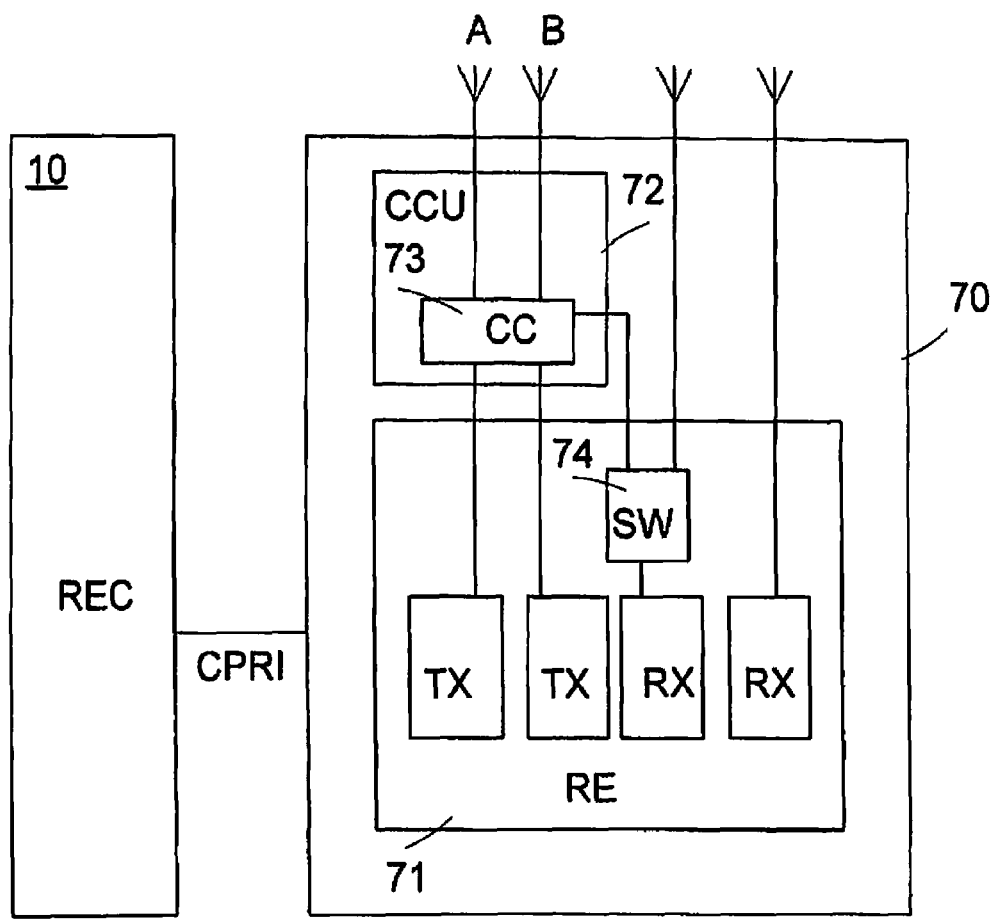
FIG. 7 is a block diagram of another exemplary radio base station in accordance with another exemplary embodiment of the present invention.

Referring to FIG. 7 there is illustrated a block diagram of another exemplary embodiment of a radio base station 300 in accordance with the present invention. As shown, the radio base station 300 comprises a radio equipment controller REC 10 that is connected, via a link interface (e.g. CPRI), to a unit 70 representing a combination of a radio equipment RE and a calibration RE, cRE. Thus in this case, the RE functions and the cRE functions are located in the same unit 70. As shown, a RE 71 of unit 70 is connected to a calibration coupling unit (CCU) 72 that is connected to the interfaces (e.g. two interfaces as shown in FIG. 7) used for connecting antennas or antenna branches A and B. The CCU 72 is arranged to sample a transmitted radio signal or signals and comprises a coupler and combiner (CC) part 73 (or a hybrid comber) which is responsible for generating summation of signals on antenna branches A and B by feeding a portion or small amount of the transmitted signals received by branches A and B, to the CC part 73. The combined signal is further sent to the RE 71. As shown in FIG. 7, the RE 71 comprises a switch 74 that is connected to the CC part 73 of the CCU 72 and to a receiver branch RX. It should be noted that the switch 74 may be connected to all receiver branches of the radio base station and the base station is not restricted to only two TX branches and two RX branches as shown in FIG. 7. The radio base station 300 and/or the unit 70 and/or the RE and/or the CCU may also include other means not shown in FIG. 7.

According to an exemplary embodiment of the present invention, the RX branch of the RE 71 connected to the switch 74, is arranged to select between receiving normal UL traffic radio signal(s) (i.e. transmitted UL radio signal(s)) and the combined radio signal samples from the CCU 72 (or CC 73). In case the combined signal from the CCU 72 is chosen, the RX of the RE 71 that is connected to the switch (SW) 74, down converts the signal (or signal samples) from DL frequency band to a baseband signal. The combined signal thus corresponds to the calibration information which is included in a subset of frames of a stream of frames to be transmitted from the RE 71 to the REC 10 over the link interface (e.g. CPRI). Note here that it is still the REC 10 that decides on the time, direction and duration of the calibration. Therefore, when the REC 10 decides that a certain selected radio sub-frame is to be used for calibration, the REC 10 orders the RE 71 of unit 70 about both the suppression of the normal radio signal reception and also what hardware resources (e.g. what receiver branch(s)) to be used for the purposes of the calibration (i.e. the cRE function). The RE 71 of unit 70 suppresses radio signal samples in order to provide capacity for carrying calibration information in a subset of the frames corresponding to the selected radio sub-frame. When the selected radio sub-frame is done, the cRE function releases the hardware resource and normal radio signal reception can continue. It should be noted that the radio base station 300 of FIG. 7 is not configured to generate a test signal to use for uplink calibration since the RX part of the antenna system is not used. Although a second switch can be connected to the other RX branch, the complete RX antenna system is not included in the calibration.

Although the different embodiments of the present invention have been exemplified as implemented in a LTE system, these can be implemented in other systems such as WiMAX, HSPA, WCDMA or any other system. Furthermore, the concept of suppressing signals from a receiver to minimize loss of traffic in a multiplexing of signals from different antenna carriers on the same antenna carrier is also valid for other systems.

While the invention has been described in terms of several preferred embodiments, it is contemplated that alternatives, modifications, permutations and equivalents thereof will become apparent to those skilled in the art upon reading of the specifications and study of the drawings. It is therefore intended that the following appended claims include such alternatives, modifications, permutations and equivalents as fall within the scope of the present invention.

The invention claimed is:

1. A method suitable for use in a radio base station, said radio base station comprising a radio equipment controller and a radio equipment that are connected via a first link interface, the method comprising the steps of:
   transmitting a stream of frames from the radio equipment to the radio equipment controller over said first link interface, wherein the frames include samples of a received radio signal, the method comprising the further steps of:
   including calibration information in a subset of said frames;
   suppressing radio signal samples to provide capacity in the subset of frames for carrying said calibration information.

2. The method of claim 1 wherein the radio equipment is adapted for receiving radio signals over a radio interface that is scheduled in time into consecutive radio sub-frames, and mobile terminals are scheduled to use specified of the radio sub-frames for uplink transmission.

3. The method of claim 2, wherein the number of frames in the subset of frames including calibration information, corresponds to the capacity needed to carry one radio sub-frame.

4. The method of claim 1, wherein the radio signal samples are received over at least two separate antenna carriers, and said frames include at least two containers for carrying radio signal samples of a corresponding antenna carrier.

5. The method of claim 4, wherein at least the one of the containers of the subset of frames carry the calibration information.

6. The method of claim 5, wherein radio signal samples are discarded to set the at least one container in the subset of frames free for carrying said calibration information.

7. The method of claim 6, wherein the at least two antenna carriers carry radio signals from the same one or more mobile terminals, and signal samples of one of the antenna carriers are selected to be discarded after the radio equipment controller has estimated that the non-discarded radio signal samples received via the remaining antenna carrier have a quality that enables signal detection.

8. The method of claim 3 further comprising, selecting the subset of frames for carrying calibration information when said subset of frames corresponds to a radio sub-frame during which the number of scheduled mobile terminals is lower that a predetermined number.

9. The method of claim 2, wherein a selected radio sub-frame is scheduled to be free from mobile terminal transmission and calibration information is carried in a subset of frames that occur in time for carrying the samples of the selected radio sub-frame.

10. The method of claim 2, wherein one selected radio sub-frame is scheduled to be free from mobile terminal transmission, with exception of one or more sub-frequencies of the radio antenna carrier, and calibration information is carried in a subset of frames that occur in time for carrying the samples of the selected radio sub-frame, in frequency outside said one or more sub-frequencies.

11. The method according claim 1 wherein the calibration information relates to measures of a downlink signal at radio equipment output to antenna.

12. The method of claim 11 wherein the measure is made at two antenna outputs, and phase and amplitude over frequency band on respective antenna output are compared.

13. The method of any of claim 1 wherein the calibration information is a predefined test signal.

14. The method of claim 1 wherein the calibration information is a predefined test signal that is added to the radio signal samples in the sub-set of frames.

15. The method according to any one of claim 1 wherein the step of including comprises including the calibration information in the subset of frames prior to transmitting said stream of frames from the radio equipment to the radio equipment controller.

16. A radio base station comprising:
   a radio equipment equipped with at least two interfaces for connecting to at least two antennas;
   a radio equipment controller connected to the radio equipment via a first link interface;
   a calibration radio equipment connected to the radio equipment via a second link interface, and further connected to the at least two interfaces used for connecting the at least two antennas, wherein,
   the radio equipment is arranged to sample a received radio signal, convert it to a base band signal, and transmit the base band signal samples in a stream of frames over the first link interface; and wherein,
   the radio equipment is arranged to include calibration information in a subset of said frames and to suppress signal samples in order to provide capacity in the subset of frames for carrying the calibration information.

17. The radio base station according to claim 16 wherein the calibration radio equipment is connected, via a calibration coupling unit, to the at least two interfaces used for connecting the at least two antennas.

18. The radio base station according to claim 17 wherein the radio equipment is further arranged to receive radio signals over a radio interface that is scheduled in time into consecutive radio sub-frames, and mobile terminals are scheduled to use specified of the radio sub-frames for uplink transmission.

19. The radio base station according to claim 16 wherein the number of frames in the subset of frames used to carry calibration information corresponds to the capacity needed to carry one radio sub-frame.

20. The radio base station according to claim 16, wherein the radio equipment is arranged to receive signal samples over at least two separate antenna carriers, and said frames include at least two containers for carrying signal samples of a corresponding antenna carrier.

21. The radio base station according to claim 20, wherein the radio equipment is adapted to include calibration information in at least one of the containers in the subset of frames.

22. The radio base station according to claim 21, wherein the radio equipment is adapted to discard signal samples to set the at least one of the containers in the subset of frames free for carrying said calibration information.

23. The radio base station according to claim 22, wherein the at least two antenna carriers carry radio signals from the same or more mobile terminals, and the radio equipment is adapted to select to discard radio signal samples of one of the antenna carriers after the radio equipment controller has estimated that the non-discarded radio signal samples received via the remaining antenna carrier have a quality that enables signal detection.

24. The radio base station according to claim 19, wherein the radio equipment is arranged to select the subset of frames for carrying calibration information when the subset of frames corresponds to a radio sub-frame during which the number of scheduled mobile terminals is lower that a predetermined number.

25. The radio base station according to claim 18 is configured to schedule one selected radio sub-frame to be free from mobile terminal transmission and the radio equipment is configured to include said calibration information in a subset of frames that occur in time for carrying the samples of the selected radio sub-frame.

26. The radio base station according to claim 18 is configured to schedule one selected radio sub-frame to be free from mobile terminal transmission, with exception of one or more frequencies of the radio antenna carrier and the radio equipment is configured to include said calibration information in a subset of frames that occur in time for carrying the samples of the selected radio sub-frame, in frequency outside said one or more frequencies.

27. The radio base station according to claim 16, wherein the calibration information relates to measures of a downlink signal at radio equipment output to antenna.

28. The radio base station according to claim 27 is configured to perform said measures at two antenna outputs and further configured to compare phase and amplitude over frequency band on respective antenna output.

29. The radio base station according to claim 16, wherein the calibration radio equipment is configured to generate a predefined test signal and to use the predefined test signal as said calibration information which is transmitted to the radio equipment.

30. The radio base station according to claim 29, wherein the radio equipment is configured to suppress the signal samples by replacing the signal samples with the calibration information in the subset of said stream of frames prior to transmitting to the radio equipment controller.

31. The radio base station according to claim 29, wherein the radio equipment is configured to suppress the signal samples by adding the calibration information to the signal samples in the subset of said stream of frames prior to transmitting to the radio equipment controller.

32. A radio base station comprising:
a unit comprising a radio equipment equipped with at least two interfaces for connecting to at least two antennas;
a radio equipment controller connected to the radio equipment of said unit via a link interface;
said unit further comprising a calibration coupling unit arranged to be connected to the at least two interfaces; the calibration coupling unit is further arranged to sample a transmitted radio signal and to transmit radio signal samples to the radio equipment;
wherein the radio equipment is arranged to select between the radio signal samples received from the calibration coupling unit and at least one radio signal received from any of the antennas; the radio equipment is further arranged to convert the radio signal samples to a baseband signal; to transmit the samples in a stream of frames to the radio equipment controller;
to include calibration information in a subset of the frames and suppress signal samples in order to provide capacity in the subset of frames for carrying the calibration information.

33. The radio base station according to claim 32, wherein radio signal samples received by the radio equipment from the calibration coupling unit correspond to samples of a combined signal generated by a coupler and combiner part of said calibration coupling unit, said coupler and combiner part is arranged to generate the combined signal by performing a summation of portions of said transmitted radio signal.

34. The radio base station according to claim 33, wherein the combined signal represents said calibration information.

35. The radio base station according to claim 33, wherein the radio equipment comprises a switch for selecting between receiving said at least one radio signal received from any of the antennas and said combined signal.

* * * * *